(12) United States Patent
Busby

(10) Patent No.: US 12,485,777 B2
(45) Date of Patent: Dec. 2, 2025

(54) CONTACTOR ASSEMBLY FOR BATTERY PACK OF ELECTRIC WORK VEHICLE

(71) Applicant: Perkins Engines Company Limited, Peterborough (GB)

(72) Inventor: Robert D. Busby, Whittlesey (GB)

(73) Assignee: Perkins Engines Company Limited, Peterborough (GB)

(*) Notice: Subject to any disclaimer, the term of this patent is extended or adjusted under 35 U.S.C. 154(b) by 551 days.

(21) Appl. No.: 18/076,746

(22) Filed: Dec. 7, 2022

(65) Prior Publication Data

US 2023/0182582 A1  Jun. 15, 2023

(30) Foreign Application Priority Data

Dec. 9, 2021 (GB) ...................... 2117812

(51) Int. Cl.
*H01M 10/44* (2006.01)
*B60L 50/60* (2019.01)
(Continued)

(52) U.S. Cl.
CPC ........... *B60L 50/60* (2019.02); *H01M 10/425* (2013.01); *H01M 10/44* (2013.01); *H02J 7/0045* (2013.01);
(Continued)

(58) Field of Classification Search
CPC ..... B60L 50/60; H02J 7/0045; H01M 10/425; H01M 10/44
(Continued)

(56) References Cited

U.S. PATENT DOCUMENTS

| 5,315,221 A | 5/1994 | Corey |
| 8,264,201 B2 | 9/2012 | Tae et al. |

(Continued)

FOREIGN PATENT DOCUMENTS

| CN | 107749632 B | 6/2020 |
| GB | 1490131 A | 10/1977 |

(Continued)

OTHER PUBLICATIONS

European Examination Report for EP Patent Appln. No. 22208673.8, mailed Apr. 24, 2023 (7 pgs).

(Continued)

*Primary Examiner* — Nathaniel R Pelton

(57) ABSTRACT

A contactor assembly is provided for a battery module of an electric work vehicle comprising a battery management system. The battery module is configured to be charged and discharged via a first circuit. The first circuit comprises the contactor assembly, the contactor assembly comprising a first contactor in series with a second contactor. Each of the first contactor and the second contactor is configured to have a higher resistance to welding for a switching current flowing in a preferred direction than in a nonpreferred direction. The first contactor and the second contactor have opposite preferred directions. In response to an instruction to switch the contactor assembly, the battery management system is configured to determine whether the switching current direction is in the first direction or in the second direction, and to break or complete the first circuit with the contactor having a preferred direction in the switching current direction.

15 Claims, 16 Drawing Sheets

(51) Int. Cl.
  *H01M 10/42* (2006.01)
  *H02J 7/00* (2006.01)
(52) U.S. Cl.
  CPC .............. *H01M 2010/4271* (2013.01); *H01M 2220/20* (2013.01)
(58) Field of Classification Search
  USPC ........................................................ 320/109
  See application file for complete search history.

(56) References Cited

U.S. PATENT DOCUMENTS

| | | |
|---|---|---|
| 9,093,851 B2 | 7/2015 | Park et al. |
| 2015/0255975 A1* | 9/2015 | Siciak .................. B60L 3/04 307/9.1 |
| 2018/0272870 A1 | 9/2018 | Burkman et al. |
| 2020/0317076 A1* | 10/2020 | Wang .................... B60L 3/0023 |
| 2020/0339009 A1 | 10/2020 | Aschenbrenner et al. |

FOREIGN PATENT DOCUMENTS

| | | |
|---|---|---|
| JP | 2008301612 A | 12/2008 |
| WO | 2010113904 A1 | 10/2010 |

OTHER PUBLICATIONS

Great Britain Search Report related to Application No. 2117812.4; reported on Jun. 7, 2022.

TE Connectivity, "High-Voltage Automotive Contractors and Relays FAQ", TE Connectivity [Online], 2016 Available from: https://www.te.com/usa-en/faqs/high-voltage-automotive-contactors-and-relays.html [Access Jun. 1, 2022], See whole webpage, particularly the answer to the question "What can be done if bi-directional breaking capability is required?".

\* cited by examiner

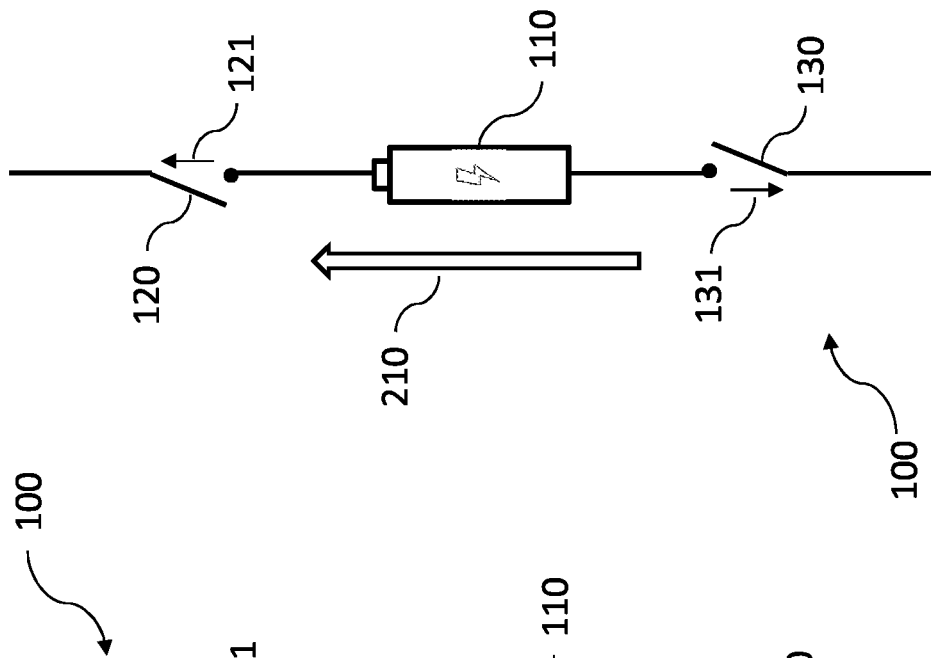
Fig. 2C
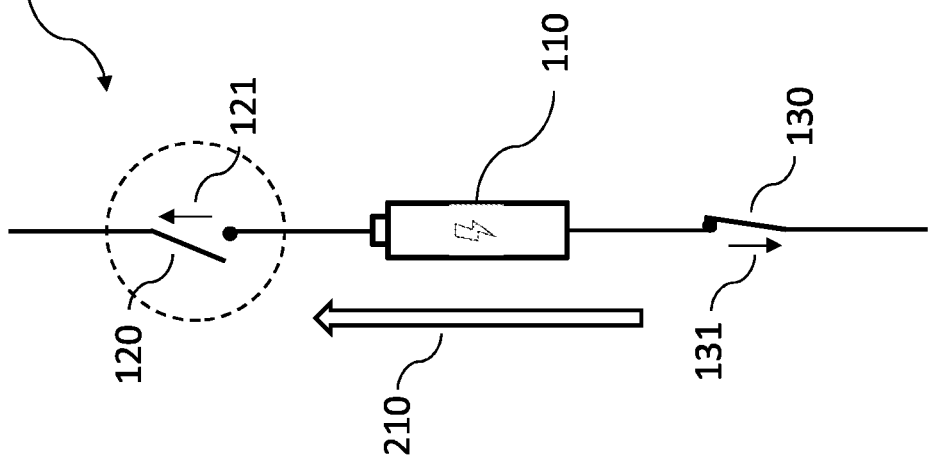
Fig. 2B
Fig. 2
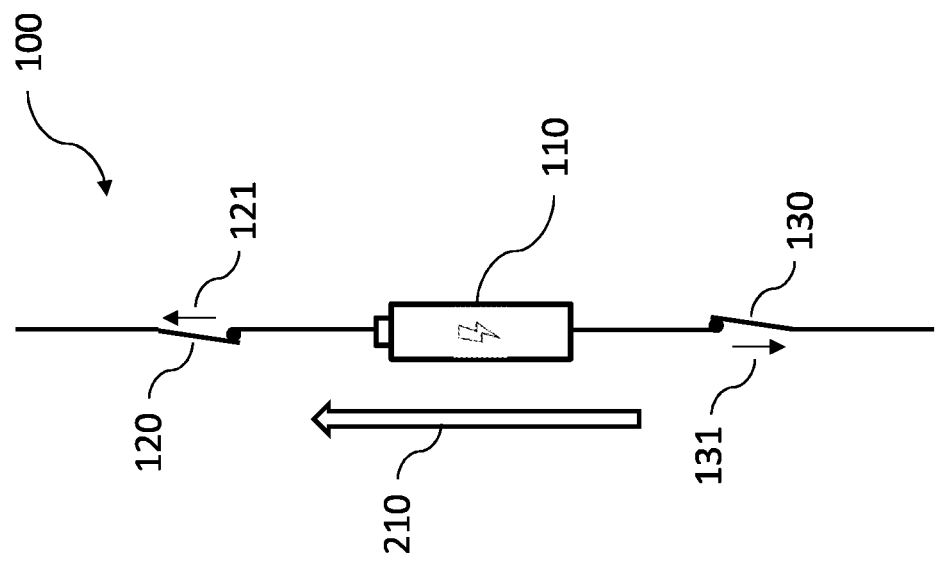
Fig. 2A

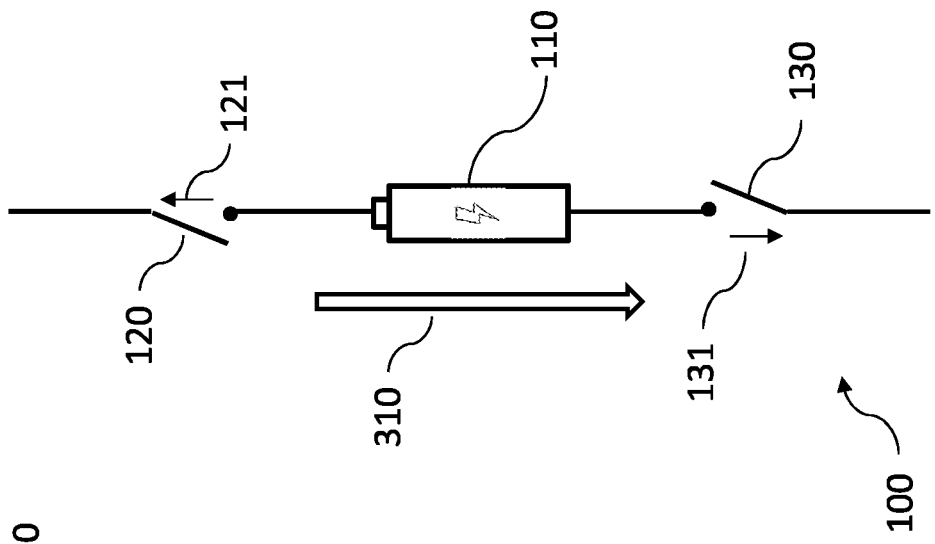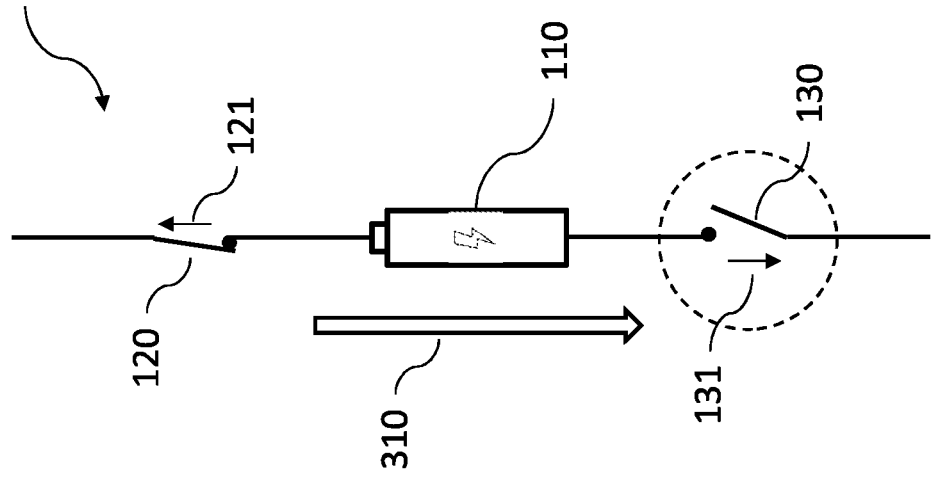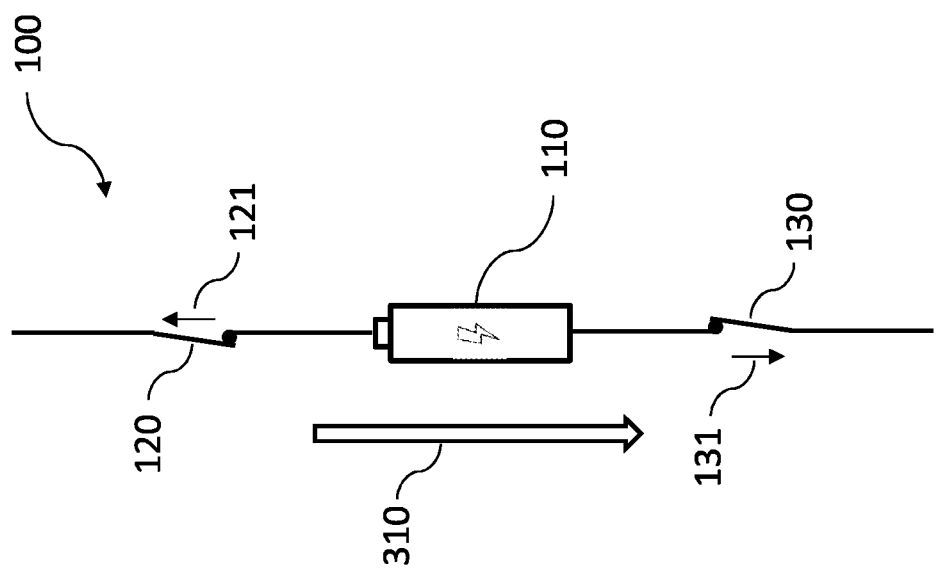
Fig. 3

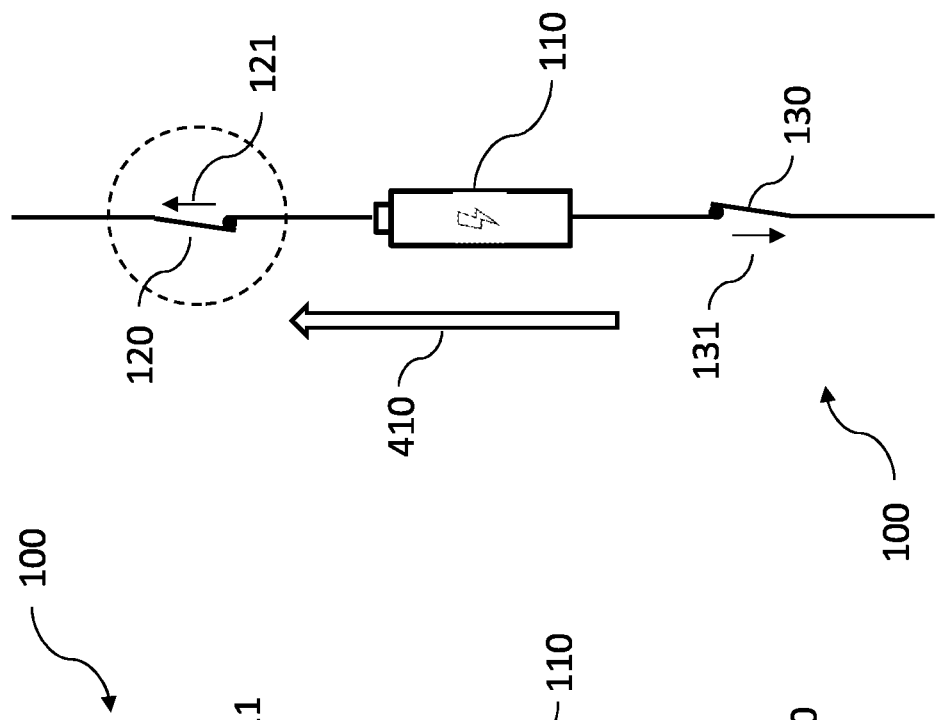
Fig. 4C
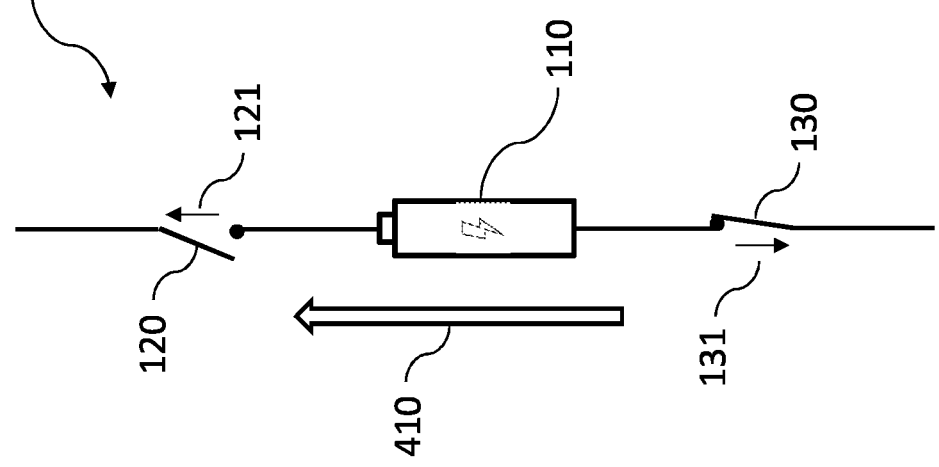
Fig. 4B
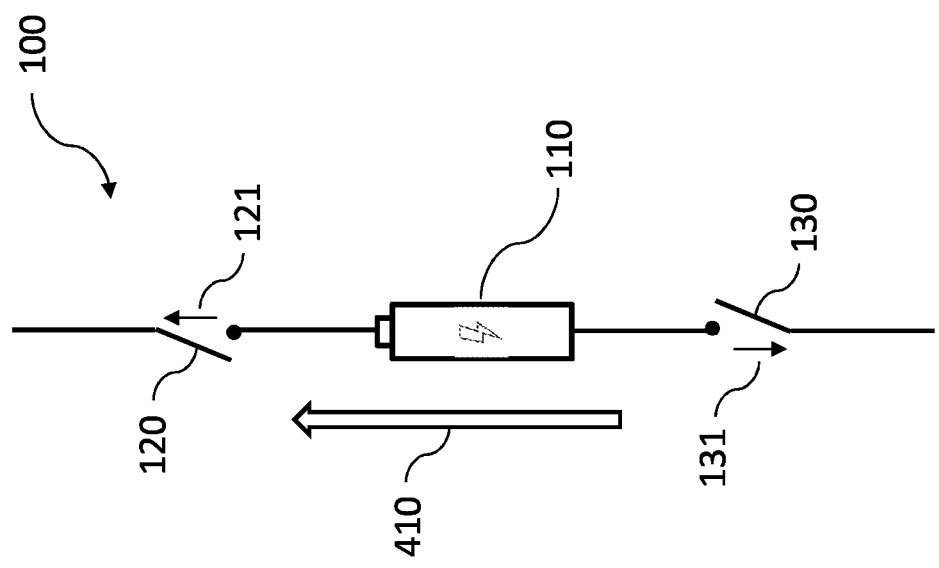
Fig. 4A
Fig. 4

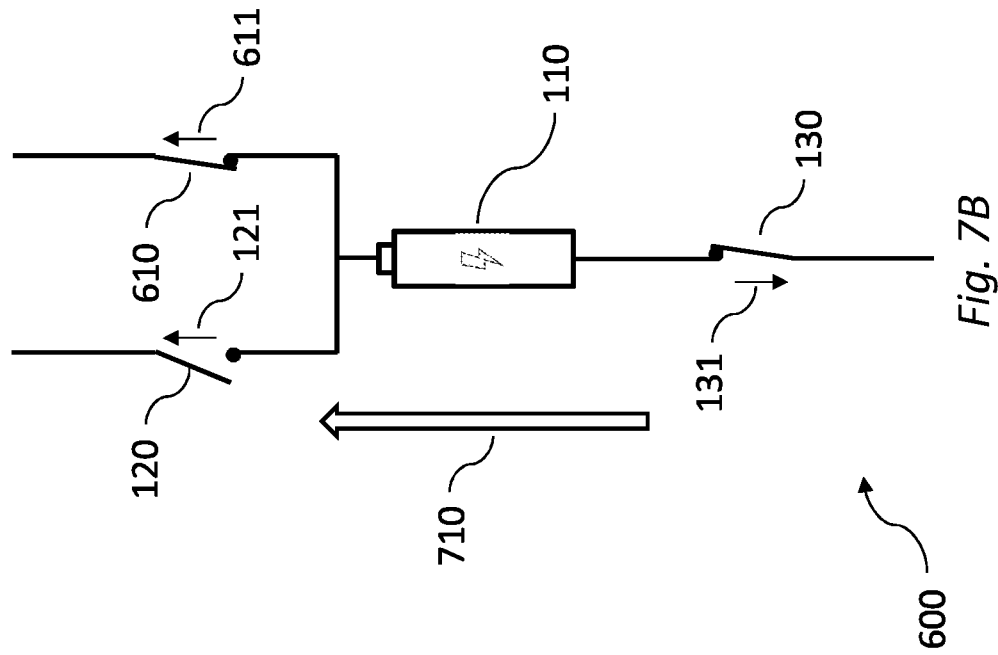
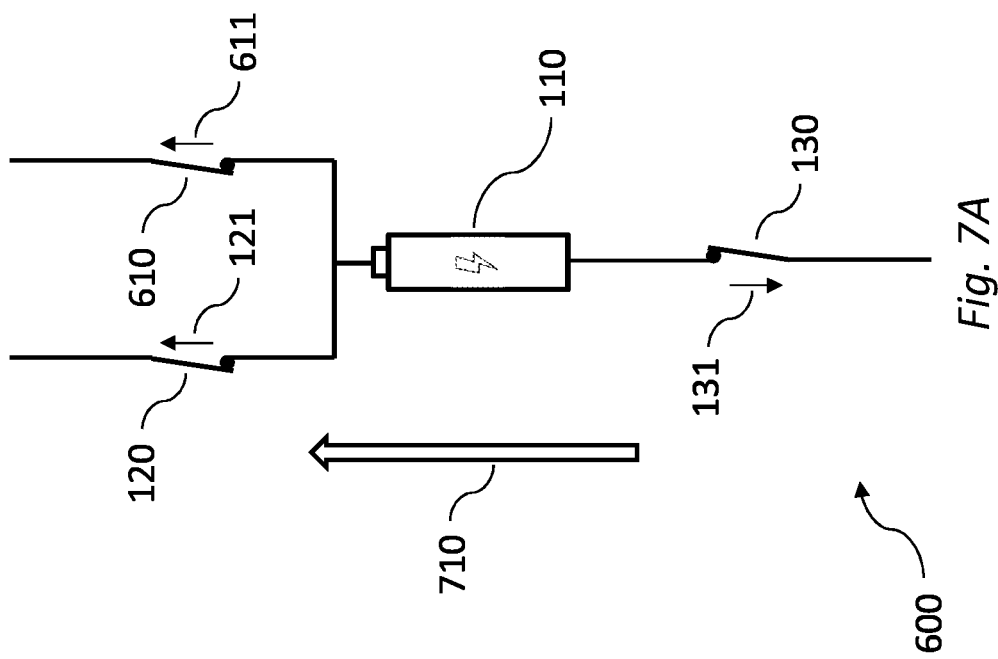
Fig. 7

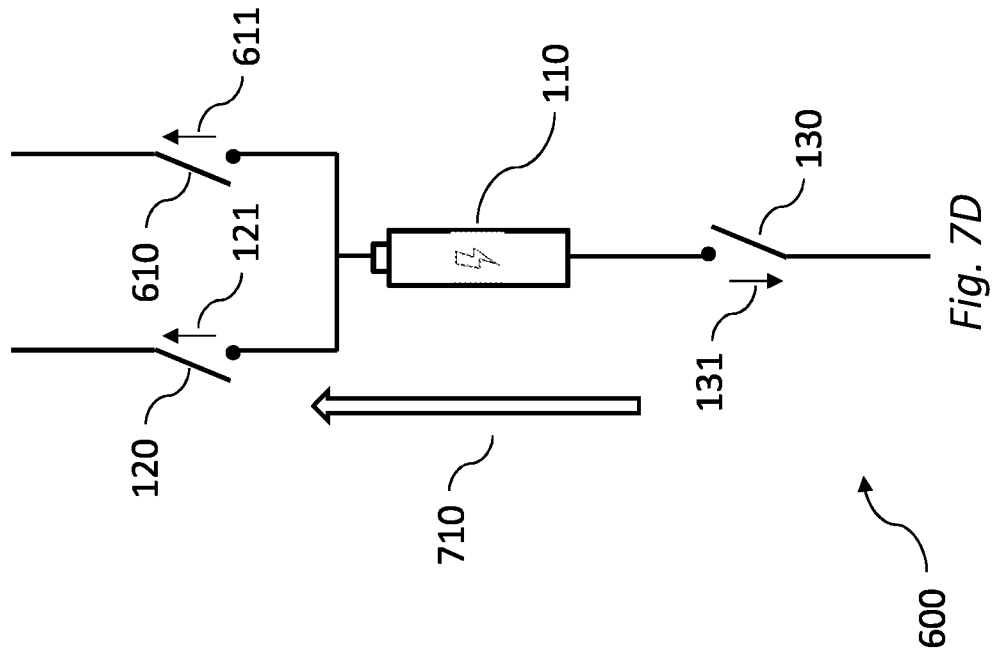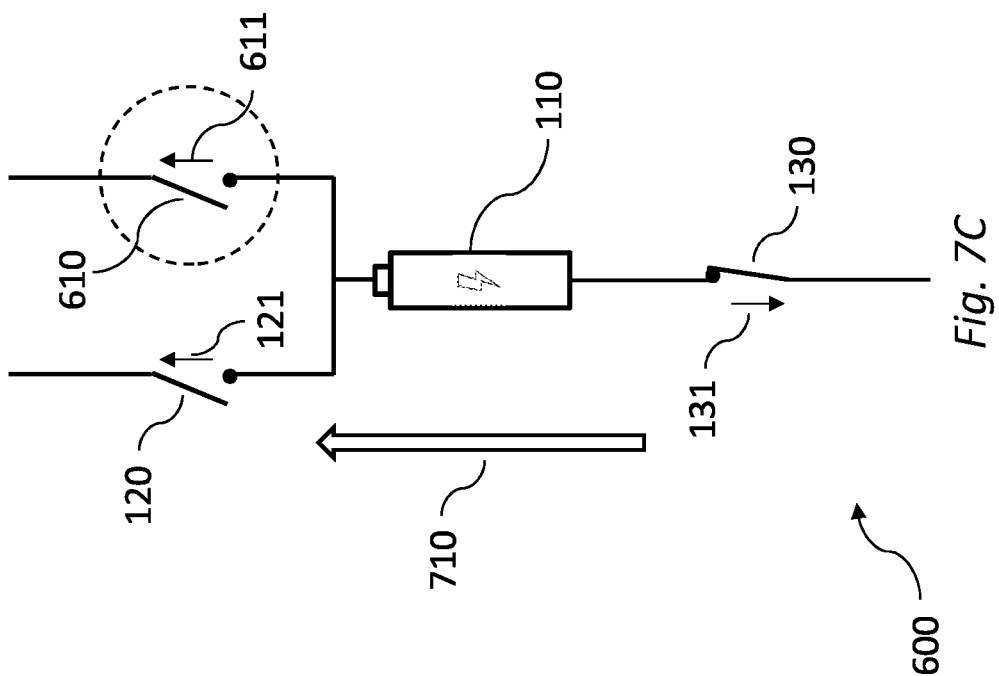

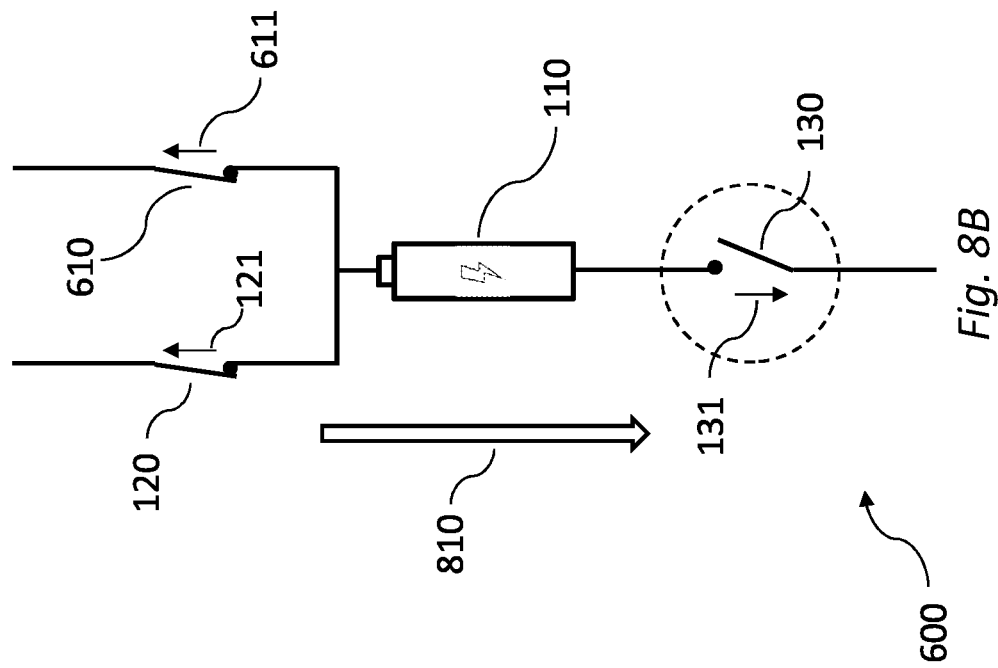
Fig. 8B
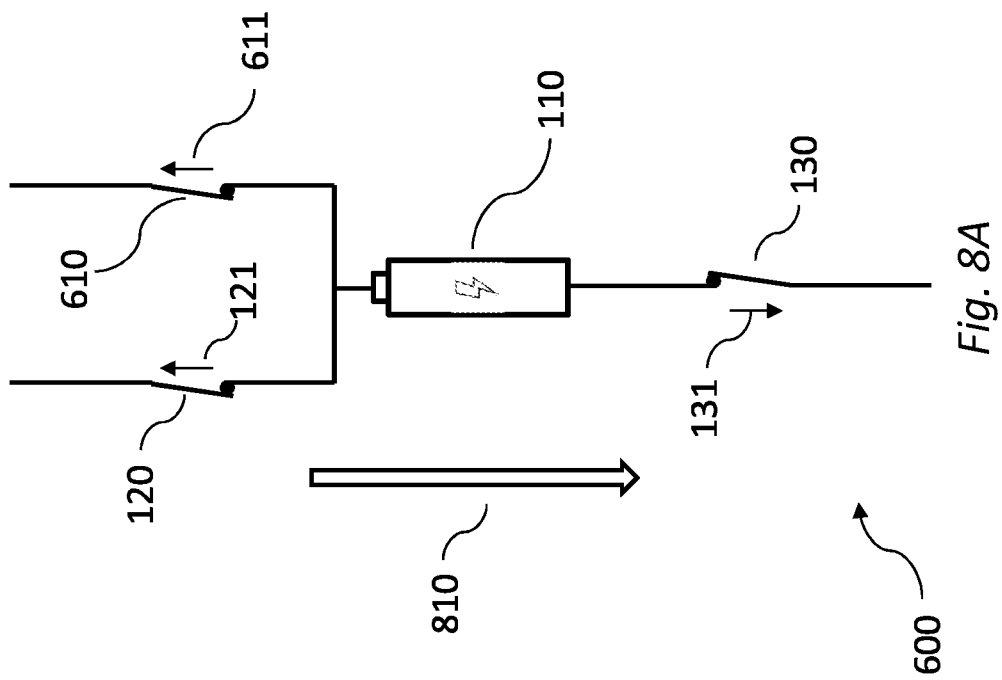
Fig. 8A
Fig. 8

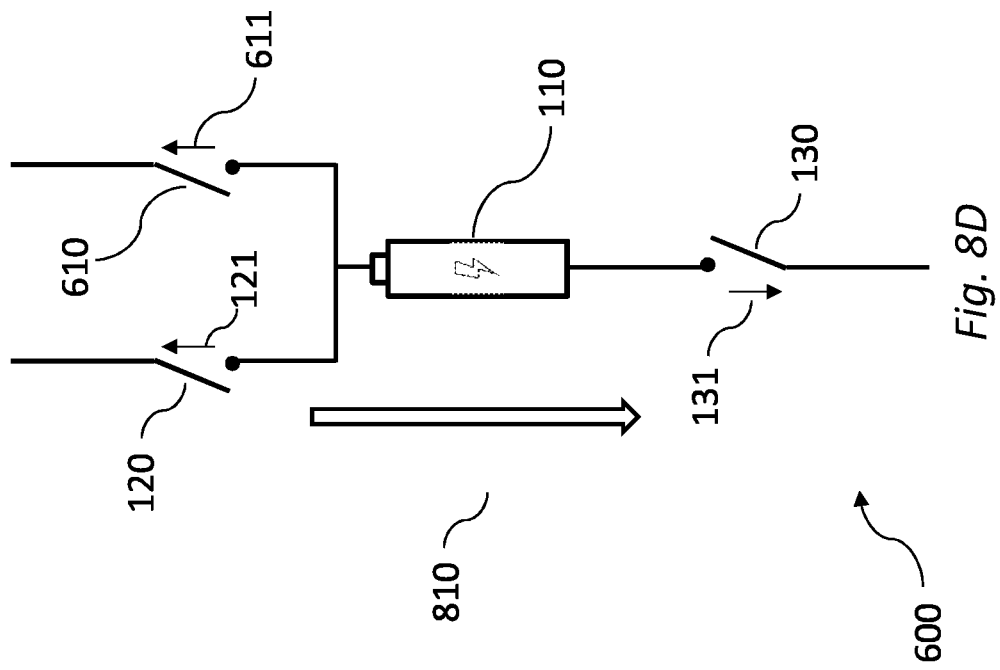
Fig. 8D
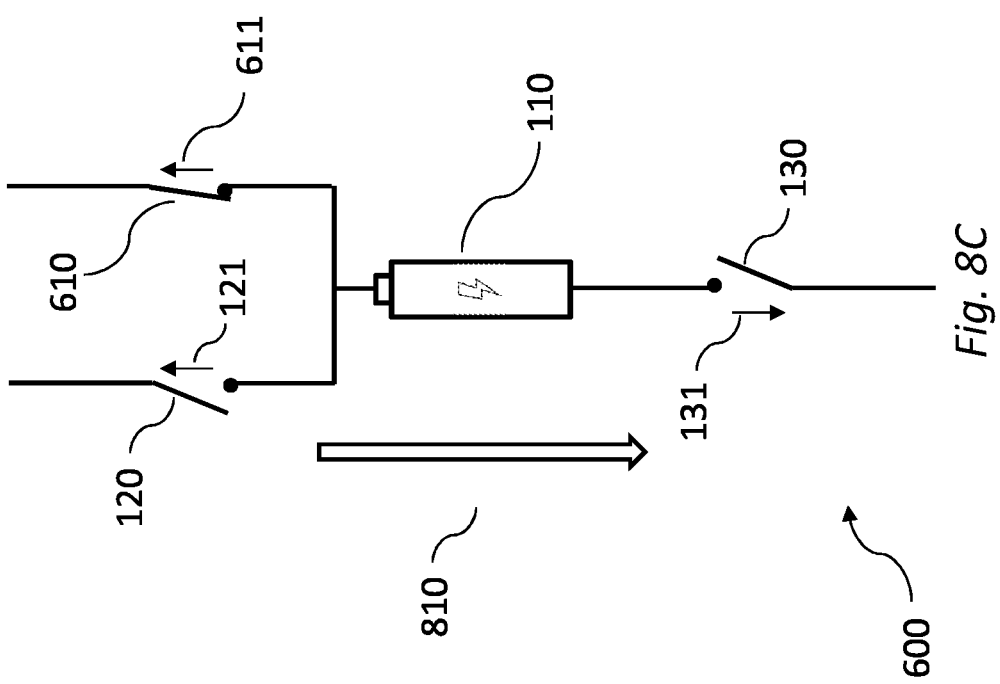
Fig. 8C
Fig. 8

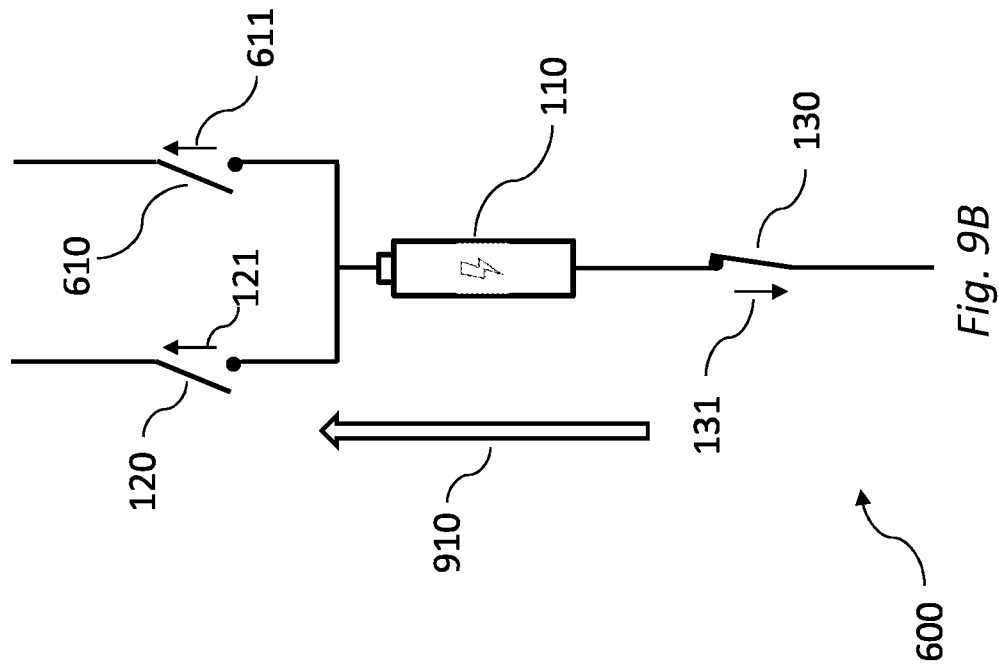
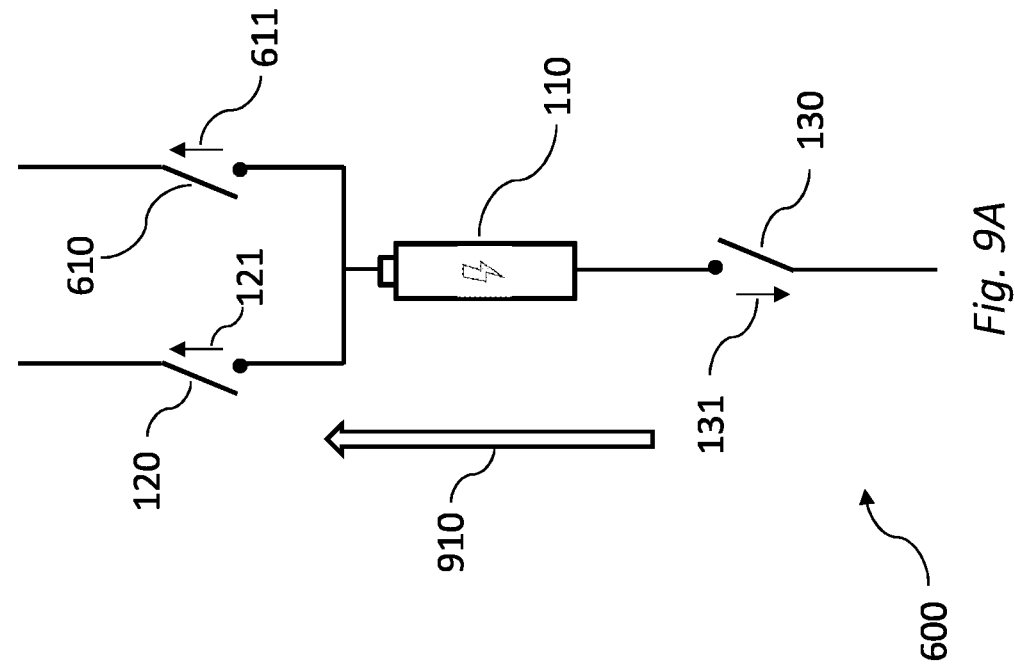

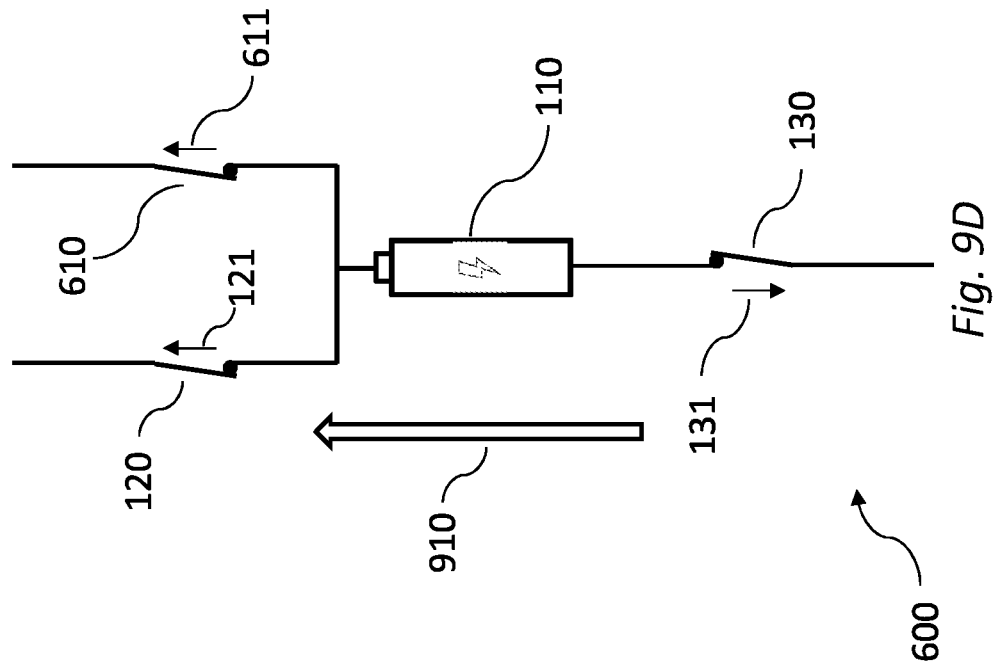
*Fig. 9C*
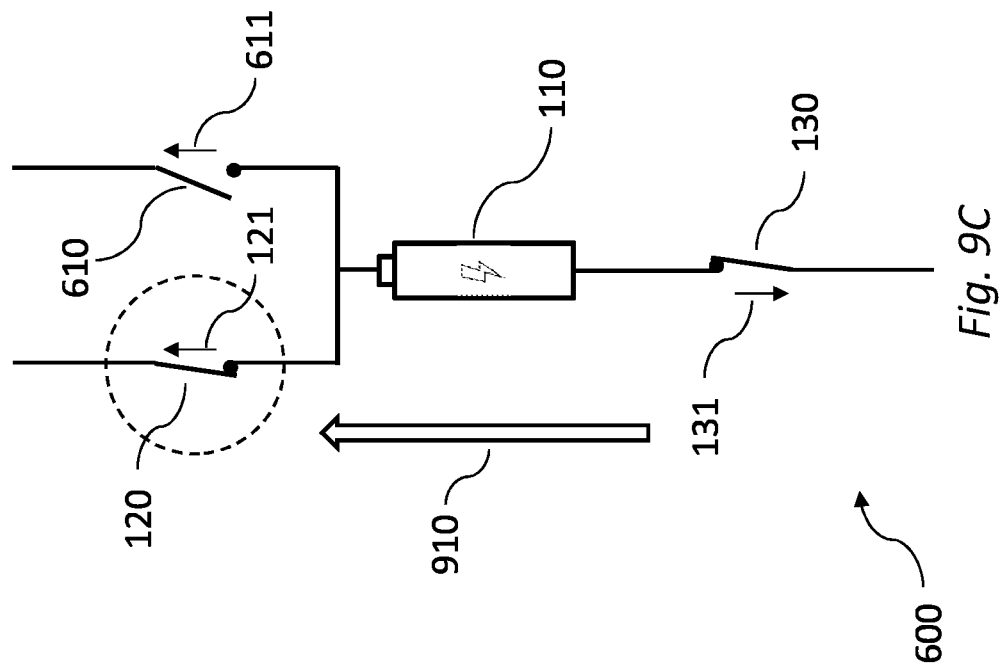
*Fig. 9D*
*Fig. 9*

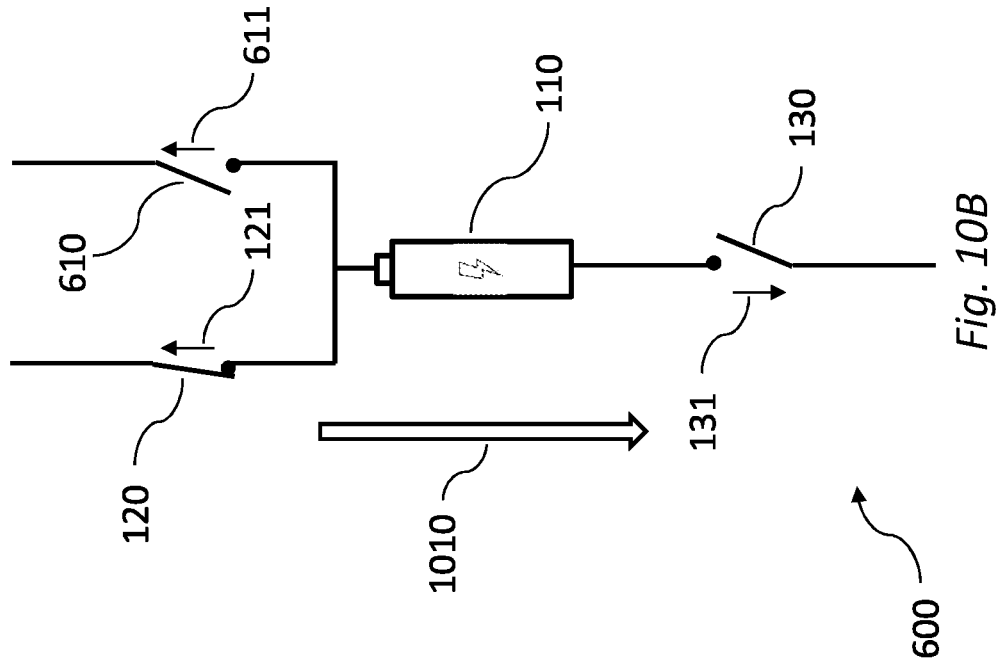
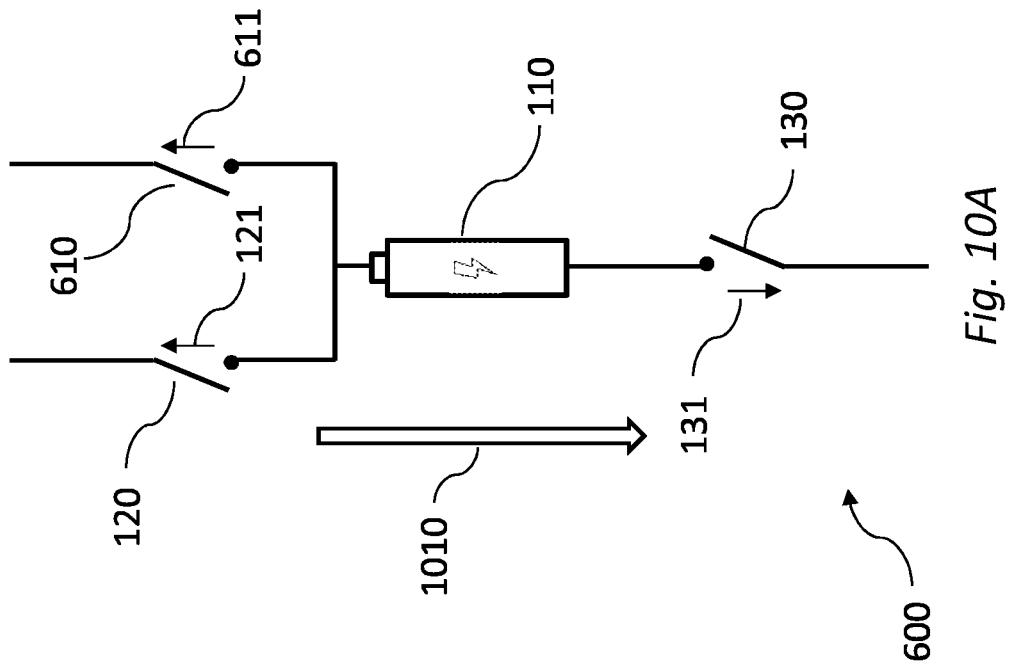

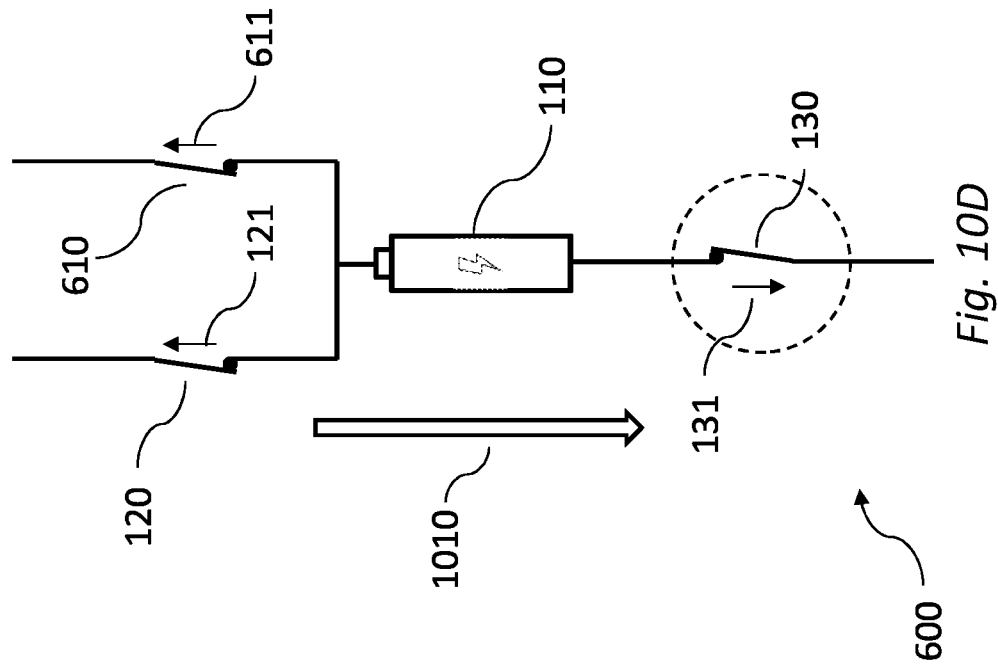
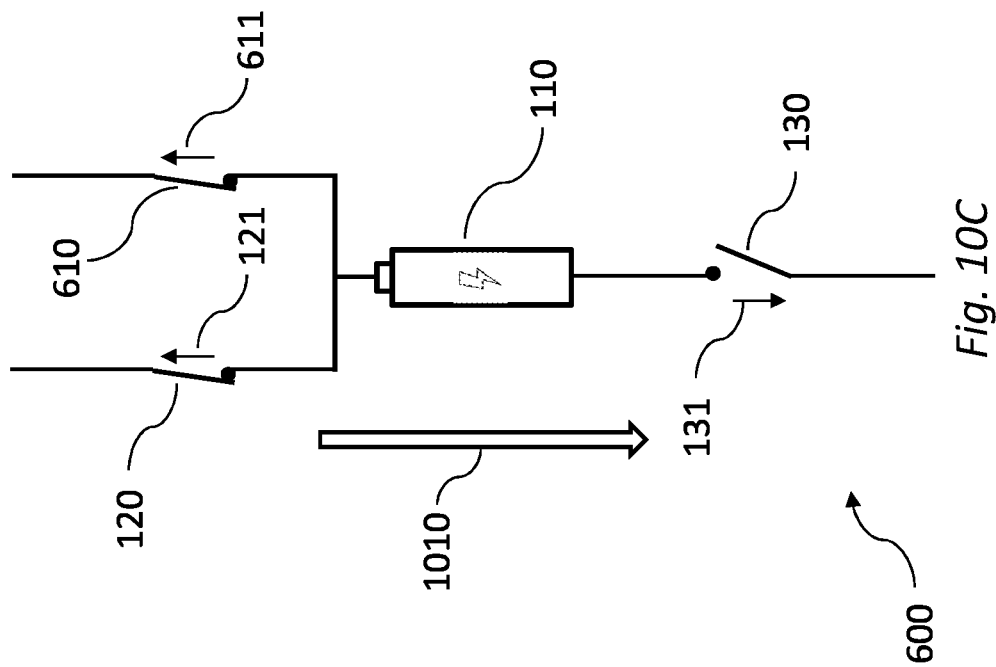

CONTACTOR ASSEMBLY FOR BATTERY PACK OF ELECTRIC WORK VEHICLE

CROSS-REFERENCE TO RELATED APPLICATION

This application claims priority under 35 USC § 119 and the Paris Convention to Great Britain Patent Application No. 2117812.4 filed on Dec. 9, 2021.

FIELD OF THE DISCLOSURE

The disclosure relates to the field of electric work vehicles.

BACKGROUND

Electrically controlled switches such as contactors or relays may experience a failure in which the contactor welds closed, caused by current flowing when a contactor is being opened or closed. As this effectively causes the contactor to fail with the contactor permanently closed, this is a potential hazard.

Conventionally, contactors are more resistant to welding with current flowing in one direction than in the other. The contactors are therefore installed in the circuit in the preferred direction, so that the current flows in the direction most resistant to welding. In many circuits this is a sufficient measure to protect against this failure as the current flows only in one direction. However, batteries may use the same circuit for charging and discharging and so the current will flow in both directions depending on the circumstance.

SUMMARY OF THE DISCLOSURE

Against this background, there is provided a contactor assembly for a battery module of an electric work vehicle comprising a battery management system. The battery module is configured to be charged and discharged via a first circuit. The first circuit comprises the contactor assembly, the contactor assembly comprising a first contactor and a second contactor, wherein the first contactor is in series with the second contactor. Each of the first contactor and the second contactor is configured to have a higher resistance to welding for a switching current flowing in a preferred direction than in a nonpreferred direction. The first contactor is configured to have a preferred direction in a first direction and a nonpreferred direction in a second direction. The second contactor is configured to have a preferred direction in the second direction and a nonpreferred direction in the first direction. In response to an instruction to switch the contactor assembly, the battery management system is configured to determine whether the switching current direction is in the first direction or in the second direction. In an event that the instruction to switch comprises an instruction to open the contactor assembly the battery management system is further configured to first, open the contactor having a preferred direction in the switching current direction, and subsequently, open the contactor having a nonpreferred direction in the switching current direction. In an event that the instruction to switch comprises an instruction to close the series contactor assembly the battery management system is further configured to first, close the contactor having a nonpreferred direction in the switching current direction and subsequently, close the contactor having a preferred direction in the switching current direction.

There is also provided a method of switching a contactor assembly for a battery module of an electric work vehicle comprising a battery management system. The battery module is configured to be charged and discharged via a first circuit. The first circuit comprises the contactor assembly, the contactor assembly comprising a first contactor and a second contactor, wherein the first contactor is in series with the second contactor. Each of the first contactor and the second contactor is configured to have a higher resistance to welding for a switching current flowing in a preferred direction than in a nonpreferred direction. The first contactor is configured to have a preferred direction in a first direction and a nonpreferred direction in a second direction. The second contactor is configured to have a preferred direction in the second direction and a nonpreferred direction in the first direction. In response to an instruction to switch the contactor assembly, the method comprises using the battery management system to determine whether the switching current direction is in the first direction or in the second direction. In an event that the instruction to switch comprises an instruction to open the contactor assembly the method further comprises using the battery management system to first, open the contactor having a preferred direction in the switching current direction, and subsequently, open the contactor having a nonpreferred direction in the switching current direction. In an event that the instruction to switch comprises an instruction to close the contactor assembly the method further comprises using the battery management system to first, close the contactor having a nonpreferred direction in the switching current direction, and subsequently, close the contactor having a preferred direction in the switching current direction.

In this way, it is possible to either break or complete the first circuit using the contactor that has a preferred direction in the same direction as the current, such that the contactor that breaks or completes the circuit (and therefore switches when current is flowing) is the contactor that has the highest resistance to welding for the current direction.

BRIEF DESCRIPTION OF THE DRAWINGS

Embodiments of the disclosure will now be described, by way of example only, with reference to the accompanying drawings in which:

FIG. 2 shows a schematic diagram of the stages of opening a contactor assembly comprising a first contactor, a second contactor and a battery module wherein the first contactor and the second contactor are in series, in accordance with an embodiment of the present disclosure. FIG. 2A shows the first contactor and the second contactor closed. FIG. 2B shows the first contactor open and the second contactor closed. FIG. 2C shows the first contactor and the second contactor open.

FIG. 3 shows a schematic diagram of the stages of opening a contactor assembly comprising a first contactor, a second contactor and a battery module wherein the first contactor and the second contactor are in series, in accordance with an embodiment of the present disclosure. FIG. 3A shows the first contactor and the second contactor closed. FIG. 3B shows the first contactor closed and the second contactor open. FIG. 3C shows the first contactor and the second contactor open.

FIG. 4 shows a schematic diagram of the stages of closing a contactor assembly comprising a first contactor, a second contactor and a battery module wherein the first contactor and the second contactor are in series, in accordance with an embodiment of the present disclosure. FIG. 4A shows the first contactor and the second contactor open.

FIG. 4B shows the first contactor open and the second contactor closed. FIG. 4C shows the first contactor and the second contactor closed.

FIG. 5A shows the first contactor and the second contactor open.

FIG. 5B shows the first contactor closed and the second contactor open. FIG. 5C shows the first contactor and the second contactor closed.

FIG. 7 shows a schematic diagram of the stages of opening a contactor assembly comprising a first contactor, a second contactor, a third contactor and a battery module wherein the first contactor and the third contactor are in parallel with each other and wherein the parallel arrangement of the first contactor and third contactor is in series with the second contactor, in accordance with an embodiment of the present disclosure. FIG. 7A shows the first contactor, the second contactor and the third contactor closed. FIG. 7B shows the first contactor open, and the second and third contactors closed. FIG. 7C shows the first and third contactors open and the second contactor closed. FIG. 7D shows the first contactor, the second contactor and the third contactor open.

FIG. 8 shows a schematic diagram of the stages of opening a contactor assembly comprising a first contactor, a second contactor, a third contactor and a battery module wherein the first contactor and the third contactor are in parallel with each other and wherein the parallel arrangement of the first contactor and third contactor is in series with the second contactor, in accordance with an embodiment of the present disclosure. FIG. 8A shows the first contactor, the second contactor and the third contactor closed. FIG. 8B shows the second contactor open, and the first and third contactors closed. FIG. 8C shows the first and second contactors open and the third contactor closed. FIG. 8D shows the first contactor, the second contactor and the third contactor open.

FIG. 9 shows a schematic diagram of the stages of closing a contactor assembly comprising a first contactor, a second contactor, a third contactor and a battery module wherein the first contactor and the third contactor are in parallel with each other and wherein the parallel arrangement of the first contactor and third contactor is in series with the second contactor, in accordance with an embodiment of the present disclosure. FIG. 9A shows the first contactor, the second contactor and the third contactor open. FIG. 9B shows the second contactor closed, and the first and third contactors open. FIG. 9C shows the first and second contactors closed and the third contactor open. FIG. 9D shows the first contactor, the second contactor and the third contactor closed.

FIG. 10 shows a schematic diagram of the stages of closing a contactor assembly comprising a first contactor, a second contactor, a third contactor and a battery module wherein the first contactor and the third contactor are in parallel with each other and wherein the parallel arrangement of the first contactor and third contactor is in series with the second contactor, in accordance with an embodiment of the present disclosure. FIG. 10A shows the first contactor, the second contactor and the third contactor open. FIG. 10B shows the first contactor closed, and the second and third contactors open. FIG. 10C shows the first and third contactors closed and the second contactor open. FIG. 10D shows the first contactor, the second contactor and the third contactor closed.

DETAILED DESCRIPTION

Figure 1:
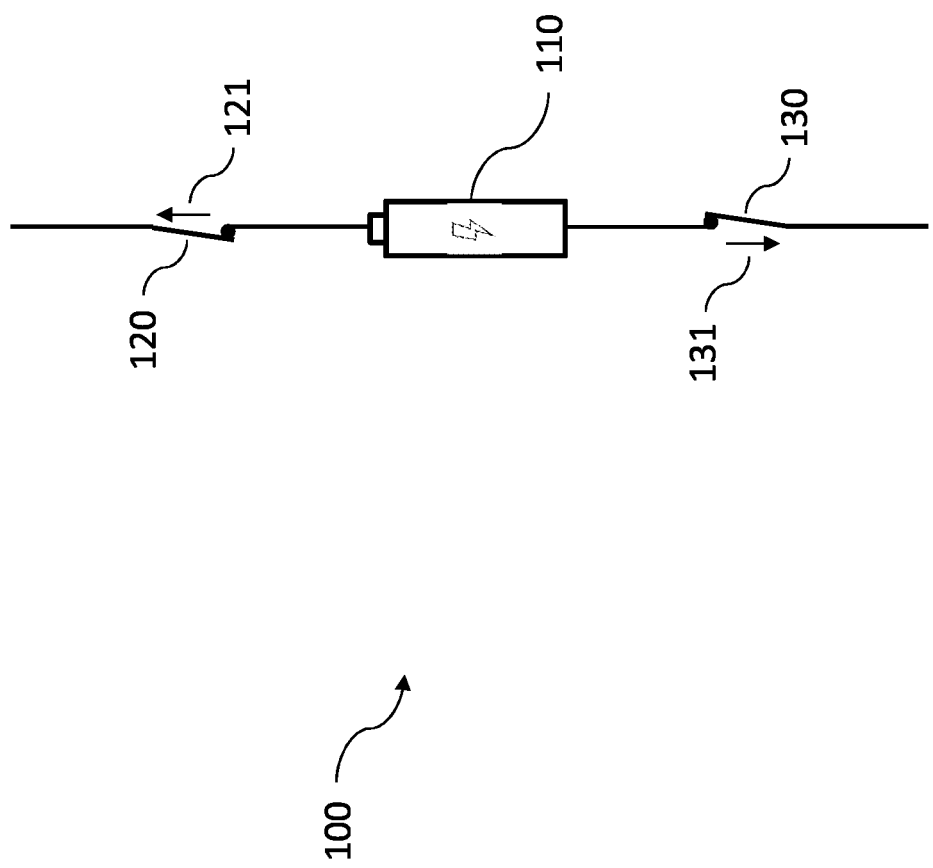
FIG. 1 shows a schematic diagram of a contactor assembly comprising a first contactor, a second contactor and a battery module wherein the first contactor and the second contactor are in series, in accordance with an embodiment of the present disclosure.

Rechargeable batteries such as those used in electric work vehicles may use the same circuit for discharging (such as when the electric work vehicle is in use) and for charging. With reference to FIG. 1, in an embodiment of the present disclosure, battery module 110 is configured to be charged and discharged via a first circuit. The first circuit comprises a contactor assembly 100, the contactor assembly comprising a first contactor 120 and a second contactor 130. The first contactor 120 is in series with the second contactor 130. Each of the first contactor 120 and the second contactor 130 is configured to have a higher resistance to welding for a switching current flowing in a preferred direction than in a nonpreferred direction. The first contactor 120 is configured to have a preferred direction in a first direction, indicated by arrow 121, and a nonpreferred direction in a second direction. The second direction is opposite to the first direction. The second contactor 130 is configured to have a preferred direction in the second direction, indicated by an arrow 131, and a nonpreferred direction in the first direction.

It will be understood that the first and second directions refer to current flow through the first circuit and therefore through the first and second contactors 120 and 130, and that the contactors may not be physically aligned with one another. For example, if a current is flowing through the first circuit in the first direction the current will flow through both the first contactor 120 and the second contactor 130 in the first direction, even if the first contactor 120 is physically at a finite angle with respect to the second contactor 130 (for example an angle that is neither 0 degrees nor 180 degrees).

The first contactor 120 and the second contactor 130 are shown as being on opposite sides of the battery module 110. Alternatively, the first contactor 120 and the second contactor 130 may be arranged on the same side of the battery module 110.

In response to an instruction to switch the contactor assembly 100, a battery management system is configured to determine whether the switching current direction is in the first direction or in the second direction. In an event that the instruction to switch comprises an instruction to open the contactor assembly, the battery management system is configured to first open the contactor having a preferred direction in the switching current direction, and to subsequently open the contactor having a nonpreferred direction in the switching current direction. In an event that the instruction to switch comprises an instruction to close the series contactor assembly, the battery management system is configured to first close the contactor having a nonpreferred direction in the switching current direction, and to subsequently close the contactor having a preferred direction in the switching current direction.

In an embodiment, a method of switching a contactor assembly for a battery module of an electric work vehicle is provided, wherein the electric work vehicle comprises a battery management system. The battery module is configured to be charged and discharged via a first circuit. The first circuit comprises the contactor assembly, the contactor assembly comprising a first contactor and a second contactor, wherein the first contactor is in series with the second contactor. Each of the first contactor and the second contactor is configured to have a higher resistance to welding for a switching current flowing in a preferred direction than in a nonpreferred direction. The first contactor is configured to have a preferred direction in a first direction and a nonpreferred direction in a second direction. The second contactor is configured to have a preferred direction in the second direction and a nonpreferred direction in the first direction. In response to an instruction to switch the contactor assembly, the method comprises using the battery management system to determine whether the switching current direction is in the first direction or in the second direction. In an event that the instruction to switch comprises an instruction to open the contactor assembly, the method comprises first, opening the contactor having a preferred direction in the switching current direction and subsequently, opening the contactor having a nonpreferred direction in the switching current direction. In an event that the instruction to switch comprises an instruction to close the contactor assembly the method comprises first, closing the contactor having a nonpreferred direction in the switching current direction, and subsequently, closing the contactor having a preferred direction in the switching current direction.

FIG. 2 shows an example of the stages of opening a contactor assembly 100 with the current flowing in the first direction (indicated by arrow 210). In FIG. 2A, the first contactor 120 and the second contactor 130 are closed. In response to an instruction to open the contactor assembly, the first contactor to be opened is the contactor with a preferred direction in the same direction as the current. In this case the current is in the first direction so the first contactor 120 is opened first. FIG. 2B shows the contactor assembly 100 after the first contactor 120 has been opened, with the first contactor 120 open and the second contactor 130 closed. Opening the first contactor 120 breaks the first circuit, so the first circuit is broken by opening the contactor with the preferred direction in the same direction as the current (in the Figures, a dashed circle will be used to indicate opening the contactor that breaks the first circuit in response to an instruction to open the contactor assembly, or closing the contactor that completes the first circuit in response to an instruction to close the contactor assembly). The second contactor to be opened is the contactor with a nonpreferred direction in the same direction as the current, such that the contactor with a nonpreferred direction in the same direction as the current is opened when the current is no longer flowing. In this case the current is in the first direction so the second contactor 130 is opened second. FIG. 2C shows the contactor assembly 100 with both the first contactor 120 and the second contactor 130 open.

FIG. 2 (and FIGS. 3 to 5, described shortly) show the first contactor 120 and the second contactor 130 arranged on opposite sides of the battery module 110. Alternatively, the first contactor 120 and the second contactor 130 may be arranged on the same side of the battery module 110.

FIG. 3 shows an example of the stages of opening a contactor assembly 100 with the current flowing in the second direction (indicated by arrow 310). In FIG. 3A, the first contactor 120 and the second contactor 130 are closed. In response to an instruction to open the contactor assembly, the first contactor to be opened is the contactor with a preferred direction in the same direction as the current. In this case the current is in the second direction so the second contactor 130 is opened first. FIG. 3B shows the contactor assembly 100 after the second contactor 130 has been opened, with the second contactor 130 open and the first contactor 120 closed. Opening the second contactor 130 (as indicated by a dashed circle) breaks the first circuit, so the first circuit is broken by opening the contactor with the preferred direction in the same direction as the current. The second contactor to be opened is the contactor with a nonpreferred direction in the same direction as the current, such that the contactor with a nonpreferred direction in the same direction as the current is opened when the current is no longer flowing. In this case the current is in the second direction so the first contactor 120 is opened second. FIG. 3C shows the contactor assembly 100 with both the first contactor 120 and the second contactor 130 open.

FIG. 4 shows an example of the stages of closing a contactor assembly 100 with the current flowing in the first direction (indicated by arrow 410). In FIG. 4A, the first contactor 120 and the second contactor 130 are open. In response to an instruction to close the contactor assembly, the first contactor to be closed is the contactor with a nonpreferred direction in the same direction as the current, such that the contactor with a nonpreferred direction in the same direction as the current is closed when the current is not flowing. In this case the current is in the first direction so the second contactor 130 is closed first. FIG. 4B shows the contactor assembly 100 after the second contactor 130 has been closed, with the second contactor 130 closed and the first contactor 120 open. The second contactor to be closed is the contactor with a preferred direction in the same direction as the current. In this case the current is in the first direction so the first contactor 120 is closed second. FIG. 4C shows the contactor assembly 100 with both the first contactor 120 and the second contactor 130 closed. Closing the first contactor 120 (indicated by a dashed circle) completes the first circuit, so the first circuit is completed by closing the contactor with the preferred direction in the same direction as the current.

Figure 5:
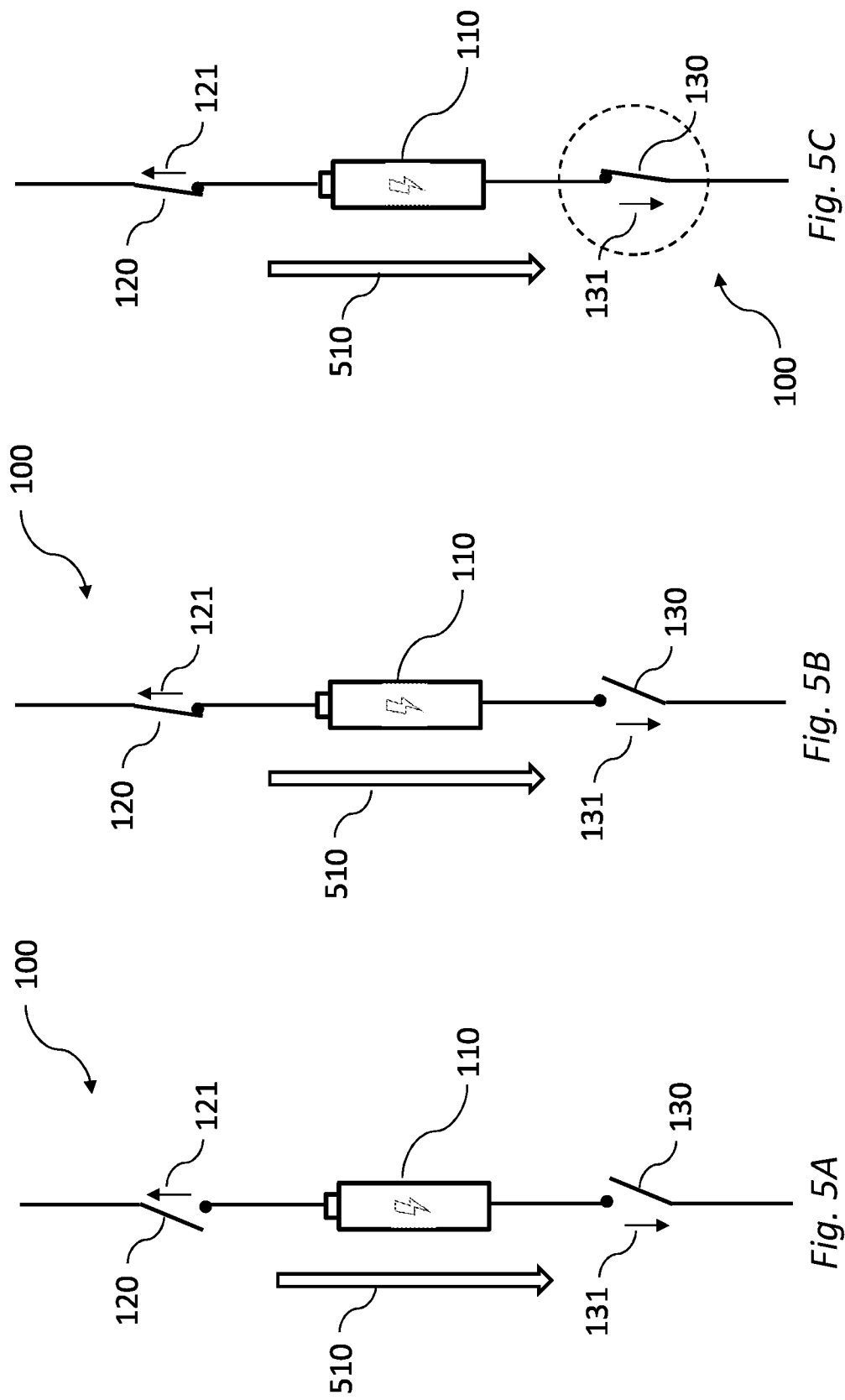
FIG. 5 shows a schematic diagram of the stages of closing a contactor assembly comprising a first contactor, a second contactor and a battery module wherein the first contactor and the second contactor are in series, in accordance with an embodiment of the present disclosure.

FIG. 5 shows an example of the stages of closing a contactor assembly 100 with the current flowing in the second direction (indicated by arrow 510). In FIG. 5A, the first contactor 120 and the second contactor 130 are open. In response to an instruction to close the contactor assembly, the first contactor to be closed is the contactor with a nonpreferred direction in the same direction as the current, such that the contactor with a nonpreferred direction in the same direction as the current is closed when the current is not flowing. In this case the current is in the second direction so the first contactor 120 is closed first. FIG. 5B shows the contactor assembly 100 after the first contactor 120 has been closed, with the first contactor 120 closed and the second contactor 130 open. The second contactor to be closed is the contactor with a preferred direction in the same direction as the current. In this case the current is in the second direction so the second contactor 130 is closed second. FIG. 5C shows the contactor assembly 100 with both the first contactor 120 and the second contactor 130 closed. Closing the second contactor 130 (indicated by a dashed circle) completes the first circuit, so the first circuit is completed by closing the contactor with the preferred direction in the same direction as the current.

Figure 6:
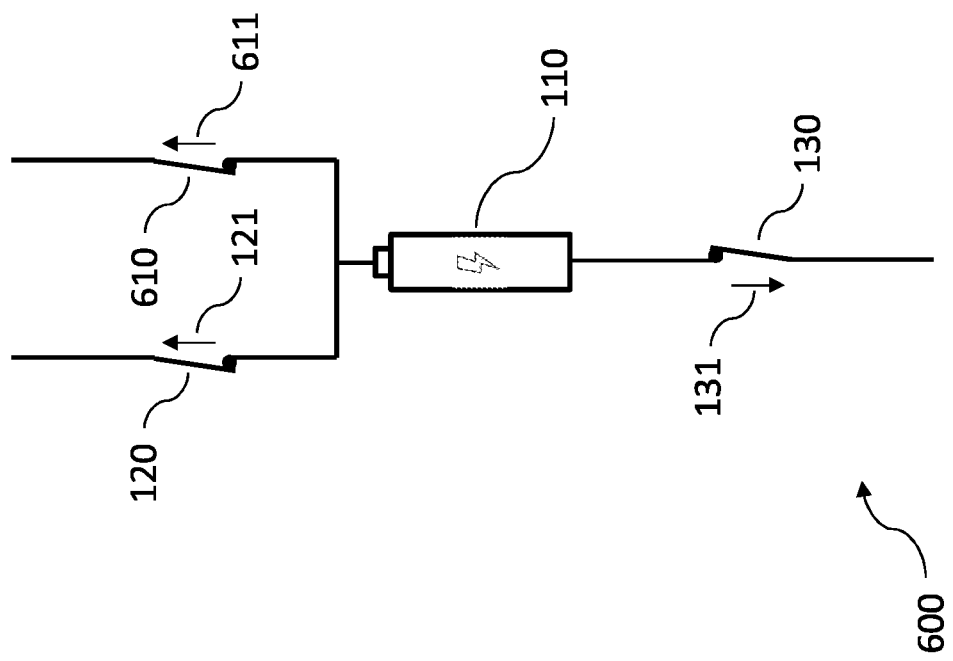
FIG. 6 shows a schematic diagram of a contactor assembly comprising a first contactor, a second contactor, a third contactor and a battery module wherein the first contactor and the third contactor are in parallel with each other and wherein the parallel arrangement of the first contactor and third contactor is in series with the second contactor, in accordance with an embodiment of the present disclosure.

With reference to FIG. 6 a contactor assembly 600 may further comprise a third contactor 610, the third contactor 610 having a preferred direction (indicated by arrow 611) in the first direction and a nonpreferred direction in the second direction. The third contactor 610 may be in parallel with the first contactor 120, such that the parallel arrangement of the first contactor 120 and the third contactor 610 is in series with the battery module 110 and with the second contactor 130. FIG. 6 shows the parallel arrangement on the opposite side of the battery module 110 to the second contactor 130, but the parallel arrangement and the second contactor 130 may be arranged on the same side of the battery module 110.

FIG. 7 shows an example of the stages of opening the contactor assembly 600 of FIG. 6 with the current flowing in the first direction (indicated by arrow 710). In FIG. 7A, the first contactor 120, the second contactor 130 and the third contactor 610 are closed. In response to an instruction to open the contactor assembly, the first contactor to be opened is a contactor with a preferred direction in the same direction as the current. In this case the current is in the first direction so either the first contactor 120 or the third contactor 610 may be opened first. FIG. 7B shows the contactor assembly 100 after the first contactor 120 has been opened, with the second contactor 130 and the third contactor 610 still open. The second contactor to be opened is the other contactor with the preferred direction in the same direction as the current, so the third contactor 610 is opened second. Opening the third contactor 610 (as indicated by a dashed circle) breaks the first circuit, so the first circuit is broken by opening the contactor with the preferred direction in the same direction as the current. FIG. 7C shows the contactor assembly 100 after the first contactor 120 and the third contactor 610 have been opened, with the second contactor 130 still open. The third contactor to be opened is the contactor with a nonpreferred direction in the same direction as the current, such that the contactor with a nonpreferred direction in the same direction as the current is opened when the current is not flowing. In this case the current is in the first direction so the second contactor 130 is opened third. FIG. 7D shows the contactor assembly 100 with the first contactor 120, the second contactor 130 and the third contactor 610 open.

FIG. 8 shows an example of the stages of opening the contactor assembly 600 of FIG. 6 with the current flowing in the second direction (indicated by arrow 810). In FIG. 8A, the first contactor 120, the second contactor 130 and the third contactor 610 are closed. In response to an instruction to open the contactor assembly, the first contactor to be opened is a contactor with a preferred direction in the same direction as the current. In this case the current is in the second direction so the second contactor 130 is opened first. FIG. 8B shows the contactor assembly 100 after the second contactor 130 has been opened, with the first contactor 120 and the third contactor 610 still closed. Opening the second contactor 130 (as indicated by a dashed circle) breaks the first circuit, so the first circuit is broken by opening the contactor with the preferred direction in the same direction as the current. The second contactor to be opened may be either of the contactors with the nonpreferred direction in the same direction as the current. In this example the first contactor 120 is opened second. FIG. 8C shows the contactor assembly 600 after the first contactor 120 and the second contactor 130 have been opened, with the third contactor 610 still open. The third contactor to be opened is the other contactor with a nonpreferred direction in the same direction as the current. The third contactor 610 is opened third. FIG. 8D shows the contactor assembly 100 with the first contactor 120, the second contactor 130 and the third contactor 610 open. Both the contactors with a nonpreferred direction in the same direction as the current are opened when the current is not flowing.

FIG. 9 shows an example of the stages of closing the contactor assembly 600 of FIG. 6 with the current flowing in the first direction (indicated by arrow 910). In FIG. 9A, the first contactor 120, the second contactor 130 and the third contactor 610 are open. In response to an instruction to close the contactor assembly, the first contactor to be closed is the contactor with a nonpreferred direction in the same direction as the current. In this case the current is in the first direction so the second contactor 130 is closed first. FIG. 9B shows the contactor assembly 600 after the second contactor 130 has been closed, with the first contactor 120 and the third contactor 610 still open. The contactor with a nonpreferred direction in the same direction as the current is therefore closed when the current is not flowing. The second contactor to be closed may be either of the contactors with the preferred direction in the same direction as the current. In this example the first contactor 120 is closed second. Closing the first contactor 120 (as indicated by a dashed circle) completes the first circuit, so the first circuit is completed by closing a contactor with a preferred direction in the same direction as the current. FIG. 9C shows the contactor assembly 600 after the first contactor 120 and the second contactor 130 have been closed, with the third contactor 610 still open. The third contactor to be closed is the other contactor with a preferred direction in the same direction as the current. The third contactor 610 is closed third. FIG. 9D shows the contactor assembly 100 with the first contactor 120, the second contactor 130 and the third contactor 610 closed.

FIG. 10 shows an example of the stages of closing the contactor assembly 600 of FIG. 6 with the current flowing in the second direction (indicated by arrow 1010). In FIG. 10A, the first contactor 120, the second contactor 130 and the third contactor 610 are open. In response to an instruction to close the contactor assembly, the first contactor to be closed is one of the contactors with a nonpreferred direction in the same direction as the current. In this case the current is in the second direction so either the first contactor 120 or the third contactor 610 are closed first. FIG. 10B shows the contactor assembly 600 after the first contactor 120 has been closed, with the second contactor 130 and the third contactor 610 still open. FIG. 10C shows the contactor assembly 600 after the first contactor 120 and the third contactor 610 have been closed, with the second contactor 130 still open. Both contactors with a nonpreferred direction in the same direction as the current is therefore closed when the current is not flowing. The third contactor to be closed is the contactors with the preferred direction in the same direction as the current. Here, the current is in the second direction so the second contactor 130 is closed third. Closing the second contactor 130 (as indicated by a dashed circle) completes the first circuit, so the first circuit is completed by closing a contactor with a preferred direction in the same direction as the current. FIG. 10D shows the contactor assembly 100 with the first contactor 120, the second contactor 130 and the third contactor 610 closed.

In an embodiment, a contactor assembly may comprise a plurality of battery modules arranged in parallel in a battery pack.

Figure 11:
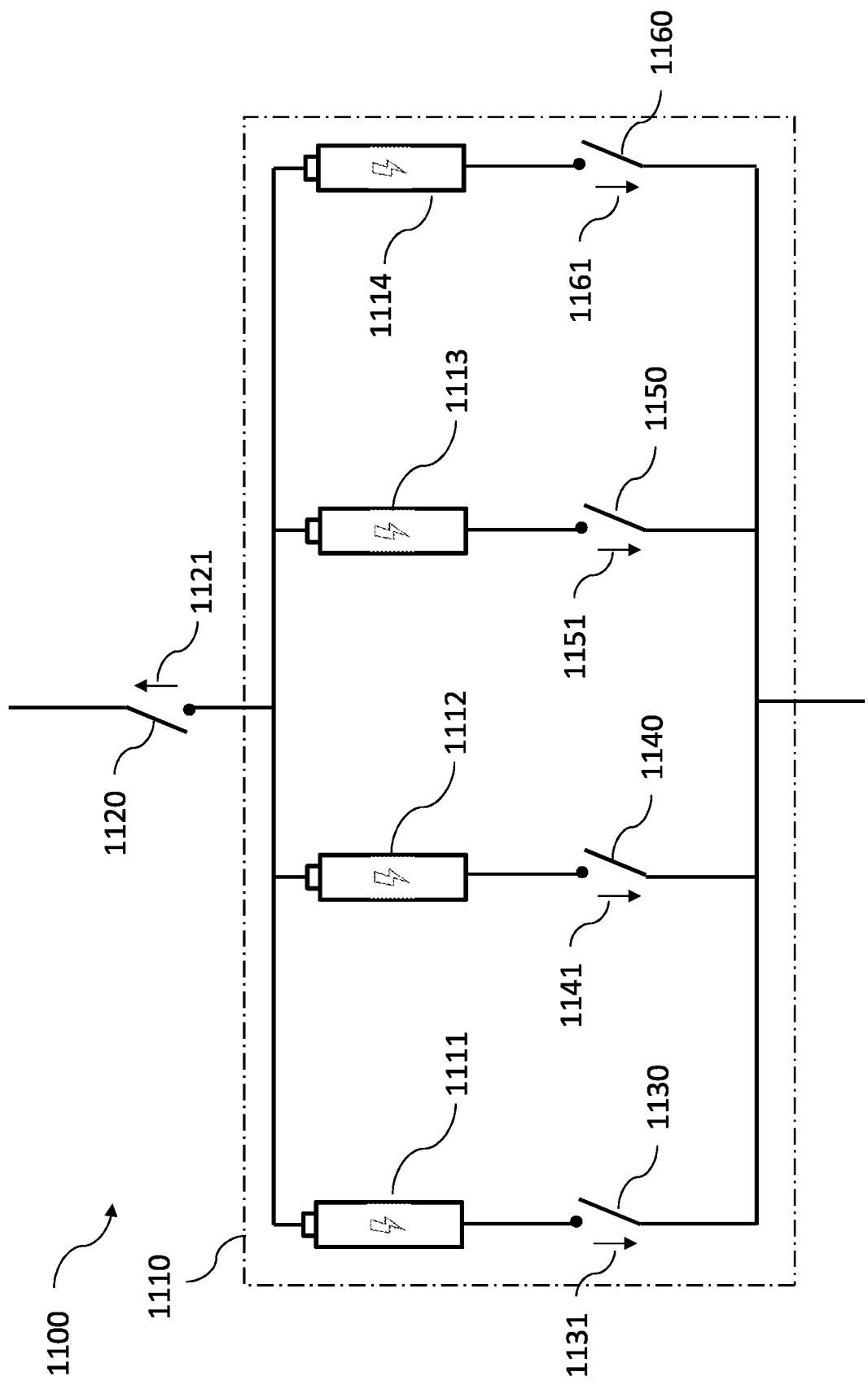
FIG. 11 shows a schematic diagram of a contactor assembly comprising a battery pack comprising a plurality of battery modules, a first contactor in series with the battery pack and a plurality of contactors each in series with a battery module, in accordance with an embodiment of the present disclosure.

With reference to FIG. 11, a contactor assembly 1100 is shown with a battery pack 1110 comprising four battery modules 1111, 1112, 1113 and 1114. It will be understood that the battery pack 1110 may comprise two, three or more than four battery modules. A first contactor 1120 is arranged in series with the battery pack 1110. The first contactor has a preferred direction (indicated by arrow 1121) in the first direction and a nonpreferred direction in the second direction. The second contactor 1130 is arranged in series with a first battery module 1111. The second contactor has a preferred direction (indicated by arrow 1131) in the second direction and a nonpreferred direction in the first direction. Each of a plurality of additional contactors are arranged in series with each of the remaining battery modules, wherein each additional contactor is equivalent to the second contactor 1130. In the example shown in FIG. 11, a third contactor 1140 is arranged in series with a second battery module 1112, a fourth contactor 1150 is arranged in series with a third battery module 1113 and a fifth contactor 1160 is arranged in series with a fourth battery module 1114. The third, fourth and fifth contactors 1140, 1150 and 1160 each have a preferred direction (indicated by arrows 1141, 1151 and 1161) in the second direction and a nonpreferred direction in the first direction. In response to an instruction to switch the contactor assembly 1100, the contactors will be opened or closed in the same way as described for the contactor assembly 100, such that the contactors with a nonpreferred direction in the same direction as the current are switched when the current is not flowing. The contactor that breaks or completes the first circuit has a preferred direction in the same direction as the current.

Figure 12:
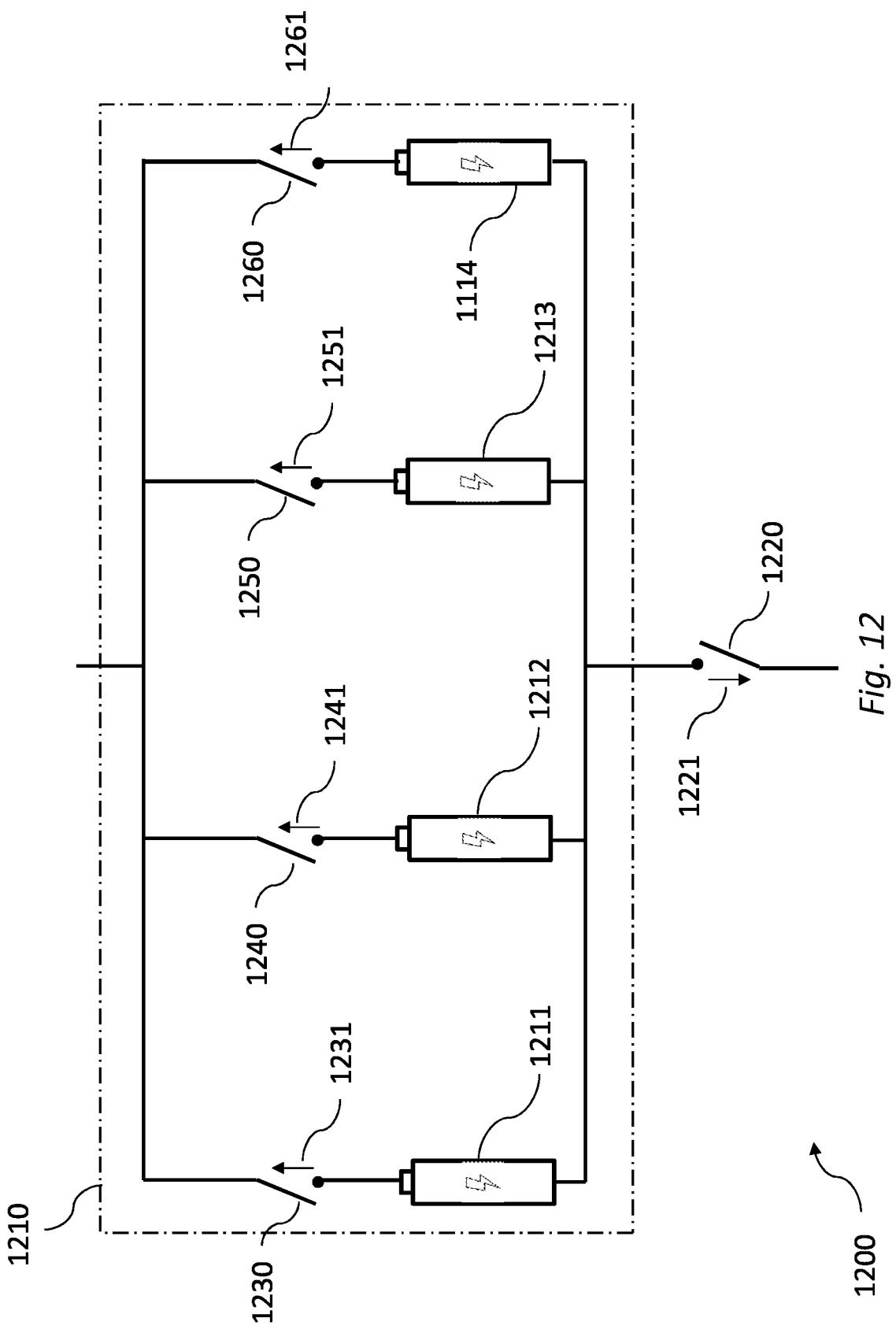
FIG. 12 shows a schematic diagram of a contactor assembly comprising a battery pack comprising a plurality of battery modules, a plurality of contactors each in series with a battery module, and a second contactor in series with the battery pack in accordance with an embodiment of the present disclosure.

With reference to FIG. 12, a contactor assembly 1200 is shown with a battery pack 1210 comprising four battery modules 1211, 1212, 1213 and 1214. It will be understood that the battery pack 1210 may comprise two, three or more than four battery modules. A first contactor 1230 is arranged in series with a first battery module 1211. The first contactor 1230 has a preferred direction (indicated by arrow 1231) in the first direction and a nonpreferred direction in the second direction. A second contactor 1220 is arranged in series with the battery pack 1210. The second contactor has a preferred direction (indicated by arrow 1221) in the second direction and a nonpreferred direction in the first direction. Each of a plurality of additional contactors are arranged in series with each of the remaining battery modules, wherein each additional contactor is equivalent to the first contactor 1230. In the example shown in FIG. 12, a third contactor 1240 is arranged in series with a second battery module 1212, a fourth contactor 1250 is arranged in series with a third battery module 1213 and a fifth contactor 1260 is arranged in series with a fourth battery module 1214. The third, fourth and fifth contactors 1240, 1250 and 1260 each have a preferred direction (indicated by arrows 1241, 1251 and 1261) in the first direction and a nonpreferred direction in the second direction. In response to an instruction to switch the contactor assembly 1100, the contactors will be opened or closed in the same way as described for the contactor assembly 100, such that the contactors with a nonpreferred direction in the same direction as the current are switched when the current is not flowing. The contactor that breaks or completes the first circuit has a preferred direction in the same direction as the current.

Although the term contactor has been used, the contactors described above may comprise any switch for an electrical circuit that may be opened and closed by a controller. The contactors may comprise electrically controlled switches or relays.

In an embodiment, the contactors may comprise a moving arm and a plate, wherein the arm makes contact with the plate when the contactor is closed. For example, the first contactor may be configured such that current flowing in the first direction flows from the fixed plate to the movable arm, and current flowing in the second direction flows from the movable arm to the fixed plate. The second contactor may be configured such that current flowing in the first direction flows from the movable arm to the fixed plate, and current flowing in the second direction flows from the fixed plate to the movable arm. In another example, the first contactor may be configured such that current flowing in the first direction flows from the movable arm to the fixed plate, and current flowing in the second direction flows from the fixed plate to the movable arm. The second contactor may be configured such that current flowing in the first direction flows from the fixed plate to the movable arm, and current flowing in the second direction flows from the movable arm to the fixed plate.

Having more than one contactor in a circuit, for example as in the embodiments described herein, allows redundancies in the circuit such that in the event that a contactor does weld shut, the circuit can be broken by another contactor. This helps to prevent the circuit failing in a closed state.

The battery management system is configured to determine which direction the current is flowing in. This information may be provided to the battery management system, or may be detected by the battery management system. For example, the battery management system or a separate system may be configured to receive a signal when the battery module is connected to a charger. The battery management system or a separate system may detect the direction of the current.

What is claimed is:

1. A contactor assembly for a battery module of an electric work vehicle comprising a battery management system, wherein:
the battery module is configured to be charged and discharged via a first circuit;
the first circuit comprises the contactor assembly, the contactor assembly comprising a first contactor and a second contactor, wherein the first contactor is in series with the second contactor;
each of the first contactor and the second contactor is configured to have a higher resistance to welding for a switching current flowing in a preferred direction than in a nonpreferred direction;
the first contactor is configured to have a preferred direction in a first direction and a nonpreferred direction in a second direction; and
the second contactor is configured to have a preferred direction in the second direction and a nonpreferred direction in the first direction;
in response to an instruction to switch the contactor assembly, the battery management system is configured to:
determine whether the switching current direction is in the first direction or in the second direction;
in an event that the instruction to switch comprises an instruction to open the contactor assembly:

first, open the contactor having a preferred direction in the switching current direction; and subsequently, open the contactor having a nonpreferred direction in the switching current direction;

in an event that the instruction to switch comprises an instruction to close the series contactor assembly:

first, close the contactor having a nonpreferred direction in the switching current direction; and subsequently, close the contactor having a preferred direction in the switching current direction.

2. The contactor assembly of claim 1 wherein the first contactor and the second contactor are in series with the battery module.

3. The contactor assembly of claim 2 wherein the first contactor and the second contactor are arranged on opposite sides of the battery module.

4. The contactor assembly of claim 3 comprising a parallel arrangement comprising a third contactor in parallel with the first contactor, wherein the parallel arrangement is in series with the battery module and the second contactor and wherein the third contactor is configured to have a preferred direction in the first direction and a nonpreferred direction in the second direction.

5. The contactor assembly of claim 4 wherein in response to an instruction to switch the contactor assembly the battery management system is configured to:

determine whether the switching current direction is in the first direction or in the second direction;

in an event that the instruction to switch comprises an instruction to open the contactor assembly:

first, open the contactor or contactors having a preferred direction in the switching current direction; and subsequently, open the contactor or contactors having a nonpreferred direction in the switching current direction;

in an event that the instruction to switch comprises an instruction to close the contactor assembly:

first, close the contactor or contactors having a nonpreferred direction in the switching current direction; and subsequently, close the contactor or contactors having a preferred direction in the switching current direction.

6. The contactor assembly of claim 1 wherein the battery module is one of a plurality of battery modules arranged in parallel in a battery pack, wherein:

the first contactor is arranged in series with the battery pack;

the second contactor is arranged in series with a first battery module of the plurality of battery modules; and each of a plurality of additional contactors are arranged in series with each of the remaining battery modules of the plurality of battery modules, wherein each additional contactor is equivalent to the second contactor.

7. The contactor assembly of claim 1 wherein the battery module is one of a plurality of battery modules arranged in parallel in a battery pack, wherein:

the second contactor is arranged in series with the battery pack;

the first contactor is arranged in series with a first battery module of the plurality of battery modules; and each of a plurality of additional contactors are arranged in series with each of the remaining battery modules of the plurality of battery modules, wherein each additional contactor is equivalent to the first contactor.

8. The contactor assembly of claim 1 wherein the first contactor and the second contactor comprise a fixed plate and a movable arm.

9. The contactor assembly of claim 2 wherein:

the first contactor is configured such that current flowing in the first direction flows from the fixed plate to the movable arm, and current flowing in the second direction flows from the movable arm to the fixed plate; and the second contactor is configured such that current flowing in the first direction flows from the movable arm to the fixed plate, and current flowing in the second direction flows from the fixed plate to the movable arm.

10. The contactor assembly of claim 2 wherein:

the first contactor is configured such that current flowing in the first direction flows from the movable arm to the fixed plate, and current flowing in the second direction flows from the fixed plate to the movable arm; and the second contactor is configured such that current flowing in the first direction flows from the fixed plate to the movable arm, and current flowing in the second direction flows from the movable arm to the fixed plate.

11. The contactor assembly of claim 1 wherein the first contactor and the second contactor are both arranged on either a first side or a second side of the battery.

12. A method of switching a contactor assembly for a battery module of an electric work vehicle comprising a battery management system, wherein:

the battery module is configured to be charged and discharged via a first circuit;

the first circuit comprises the contactor assembly, the contactor assembly comprising a first contactor and a second contactor, wherein the first contactor is in series with the second contactor;

each of the first contactor and the second contactor is configured to have a higher resistance to welding for a switching current flowing in a preferred direction than in a nonpreferred direction;

the first contactor is configured to have a preferred direction in a first direction and a nonpreferred direction in a second direction; and the second contactor is configured to have a preferred direction in the second direction and a nonpreferred direction in the first direction;

wherein in response to an instruction to switch the contactor assembly, the method comprises using the battery management system to:

determine whether the switching current direction is in the first direction or in the second direction;

in an event that the instruction to switch comprises an instruction to open the contactor assembly to:

first, open the contactor having a preferred direction in the switching current direction; and subsequently, open the contactor having a nonpreferred direction in the switching current direction;

in an event that the instruction to switch comprises an instruction to close the contactor assembly:

first, close the contactor having a nonpreferred direction in the switching current direction; and subsequently, close the contactor having a preferred direction in the switching current direction.

13. The method of claim 12 wherein the first contactor and the second contactor are in series with the battery module.

14. The method of claim 13 wherein the first contactor and the second contactor are arranged on opposite sides of the battery module.

15. The method of claim 14 further comprising a third contactor in parallel with the first contactor, wherein the parallel arrangement is in series with the battery module and the second contactor and wherein the third contactor is configured to have a preferred direction in the first direction and a nonpreferred direction in the second direction.

* * * * *